United States Patent [19]
Pitzen

[11] Patent Number: 4,955,404
[45] Date of Patent: Sep. 11, 1990

[54] METHOD AND APPARATUS FOR SEALING LEAKING VALVES ON COMPRESSED GAS TANKS

[75] Inventor: Terry Pitzen, La Mesa, Calif.

[73] Assignee: Gaslock Corporation, La Mesa, Calif.

[21] Appl. No.: 469,189

[22] Filed: Jan. 24, 1990

[51] Int. Cl.⁵ .................. F16K 13/10; F16K 51/00
[52] U.S. Cl. ..................................... 137/15; 137/316; 137/382; 137/377; 220/85 P
[58] Field of Search ............... 137/1, 15, 247, 377, 137/381, 382, 800, 801, 802, 316; 220/85 P

[56] References Cited
U.S. PATENT DOCUMENTS

| | | | |
|---|---|---|---|
| 1,413,502 | 4/1922 | Steinmetz | 137/382 X |
| 2,206,707 | 7/1940 | Shaw | 137/382 |
| 2,465,095 | 3/1949 | Harvey | 137/382 |
| 2,990,846 | 7/1961 | Rives | 137/377 |
| 3,148,690 | 9/1964 | Petersen | 137/15 |
| 3,323,541 | 6/1967 | Schneider, Jr. et al. | 137/382 X |
| 3,814,276 | 6/1974 | VanGordon et al. | 220/85 P |
| 4,489,784 | 12/1984 | Messenger | 137/1 X |

Primary Examiner—John Rivell
Attorney, Agent, or Firm—Juettner, Pyle, Lloyd & Verbeck

[57] ABSTRACT

A method and apparatus for sealing a leaking valve on a compressed gas tank to accomodate safe transport of the tank and valve from the place of use in the field to a repair depot where the tank and valve may be safely serviced. The apparatus comprises a valve cap specifically designed for practice of the method. The method resides in the steps of placing the cap over the leaking valve and attaching the cap to the tank, filling the cap with a fusible substance in liquified form, the fusible substance having a fusion temperature in excess of ambient temperature but less than about 200° F. and, upon cooling, solidifying within the cap about the valve, sealing off the cap, transporting the tank, cap and encapsulated valve from the place of use to a repair depot, at the repair depot converting the fusible substance from solidifed form to liquified form and draining the substance from the cap, and removing the cap from the tank and valve to accommodate safe servicing of the valve at the repair depot.

15 Claims, 3 Drawing Sheets

METHOD AND APPARATUS FOR SEALING LEAKING VALVES ON COMPRESSED GAS TANKS

1. Technical Field

The present invention is concerned with the safe transport and handling of toxic and other harmful or potentially harmful gases that are maintained under pressure in a portable pressure tank having a control valve thereon, and in particular, to the safe transport and handling of the tank when the valve starts to leak.

2. Backround Art

A leaking valve on a compressed gas tank containing a toxic or other harmful or potentially harmful gas under high pressure poses a great safety hazard for personnel in the vicinity of the tank. However, the valve usually cannot be serviced at the site or place of use of the tank and the gas because there is no safe way of releasing the gas from the tank to accommodate removal and servicing, i.e., repair or replacement, of the valve. The tank must be returned to the depot where it was filled with the gas or some other repair depot, where the gas can be safely removed from the tank and reclaimed, or treated or processed to a harmless condition.

However, a compressed gas tank leaking a toxic substance cannot simply be trucked over public highways to a repair depot, as that would endanger the health and safety of everyone encountering the transport vehicle.

The solution to this perplexity heretofore devised by the art resides in putting the tank with the leaking valve in a containerizer or so-called "coffin", i.e., a pressure vessel larger than the tank and valve for reception of the tank and valve and having a high pressure closure for encasing the entire tank and valve within a sealed, gas-tight, safety enclosure.

Inasmuch as the containerizer or coffin must be capable of withstanding the high pressures at which the gas is compressed in the tank, and must be large enough to receive and hold a pressure tank and its associated valve, the containerizer becomes exceedingly heavy, exceedingly expensive, and very unwieldy. It is difficult to insert a pressure tank into the containerizer due to the size and weight of the pressure tank, and the combined weight of the tank and containerizer necessitate the use of heavy duty lifting and transport equipment to transfer the containerizer to the place of use of the tank and to return the containerizer and the enclosed tank to a repair depot. As a consequence, only a small number of containerizers can as a practical matter be made available in any geographic region.

The object of the present invention is to provide a simple, light-weight and economical system for sealing leaking compressed gas tank valves for subsequent safe transport, which obviates the need for the containerizers or coffins of the prior art and all of the disadvantages inherent in their construction and mode of use.

SUMMARY OF THE DISCLOSURE

The present invention provides a simple and economical method and apparatus for sealing leaking compressed gas tank valves, involving the use of light-weight and relatively inexpensive components and procedures.

According to the method of the invention, a leaking valve on a compressed gas tank is sealed off for safe transport of the tank and valve from the place of use to a repair depot by placing a cap over the leaking valve and securing the cap to the tank; filling the cap with a fusible substance in liquified form; the fusible substance having a fusion temperature in excess of ambient temperature but less than about 200° F. and, upon cooling, solidifying within the cap about the valve to encapsulate the valve in the fusible substance; sealing off the cap; transporting the tank, cap and encapsulated valve from the place of use to a repair depot; at the repair depot, converting the fusible substance from solidified form to liquified form and draining the substance from the cap; and removing the cap from the tank and valve to accommodate safe servicing of the valve.

The apparatus of the invention is especially designed for practice of the method and comprises, in essence, a cap of a size to fit over the valve and having a closed upper end and an open lower end for receiving the valve in the cap, means at the lower end of the cap for securing the cap to the tank in surrounding relation to the valve, a fill opening in the upper end of the cap for accomodating filling of the cap with a fusible substance in liquified form, means for sealing the fill opening after the cap has been filled with the fusible substance, a drain opening in the lower end of the cap for draining fusible substance in liquified form from the cap, and means for sealing the drain opening; the cap accommodating encapsulation of the leaking valve in a fusible substance which becomes solidified within the cap about the valve for sealing off the valve for safe transport of the tank and valve to a repair depot and, at the repair depot, reliquification and draining of the fusible substance from the cap and removal of the cap from the tank and valve to accommodate access to and servicing of the leaking valve.

There is, therefore, no need for a containerizer or coffin; only the tank and the valve with the valve encapsulating cap thereon need be moved; only conventional compressed gas tank transport vehicles and equipment are required; and significant economies are realized in terms of the apparatus involved and the required support equipment and personnel.

Moreover, a complete system for practice of the present invention may be made available in convenient kit form at relatively low cost so that a large number of valve sealing kits or systems can be maintained in every geographic region where needed to facilitate prompt removal and repair of tanks with leaking valves.

In accordance with the invention, a portable kit for sealing leaking valves on compressed gas tanks is comprised of (a) the apparatus above described, (b) a supply of the fusible substance adequate, when liquified, to fill the cap of the apparatus with the fusible substance, (c) a ladle, (d) a heater, (e) a pump, and (f) a water tight container of a size to receive and carry the above recited kit components (a) through (c), the container having a lid and a carrying handle;

the container being portable to transport the kit components (a) through (e) to the locale of a compressed gas tank having a leaking valve; the container, upon removal therefrom of the components (a) through (e), constituting a reservoir for reception of water; the heater having a heating capacity sufficient to heat the water in the container to a temperature above the fusion temperature of the fusible substance; the ladle receiving the fusible substance and being immersible in the heated water for converting the fusible substance from solidified form to liquified form and for pouring the fusible substance in liquified form into the cap of the apparatus; the fusible substance thereafter solidifying within the cap of the apparatus to sealingly encapsulate the valve and accommodate transport of the tank and valve to a repair depot; the pump being operable, at the repair depot, to circulate hot water around the cap of the apparatus to convert the fusible substance from solidified form to liquified form to accommodate draining of the fusible substance from the cap and removal of the cap from the valve for safe servicing of the valve.

The invention therefore overcomes the disadvantages of the prior art and provides a method, apparatus and system for conveniently and economically sealing leaking compressed gas tank valves in a facile and practical manner, with many advantages over the prior art.

The above stated and other advantages and achievements of the present invention will become apparent from the following detailed description, as considered in connection with the accompanying drawings.

DETAILED DESCRIPTION

The following is a detailed description of the best mode presently contemplated by the applicant for carrying out his invention.

Figure 2:
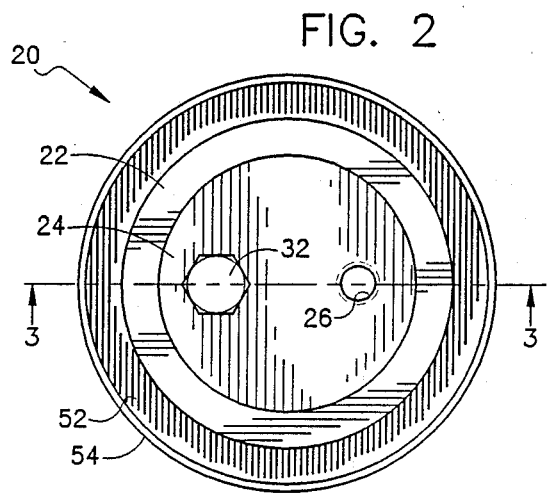
FIG. 2 is a top view of the apparatus of the invention.
Figure 1:
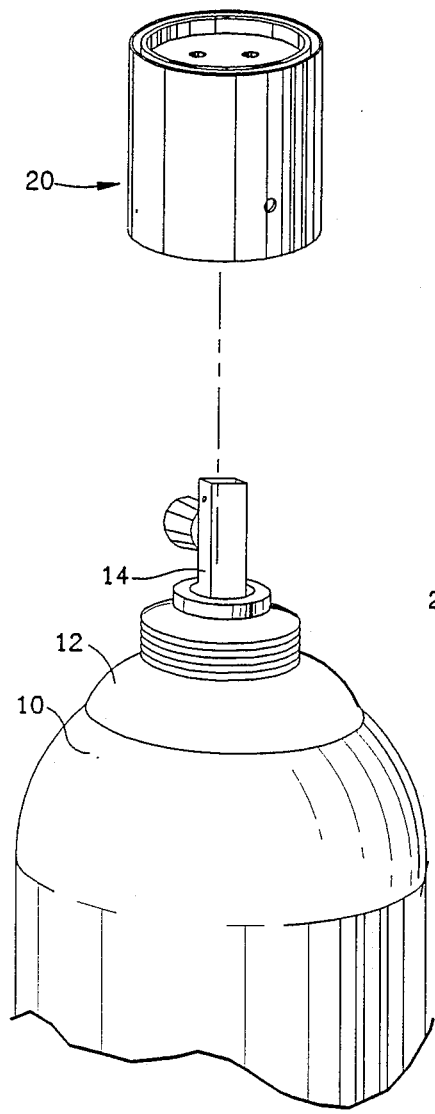
FIG. 1 is a schematic, exploded, perspective view of the top portion of a compressed gas tank with its associated control valve and the apparatus of the invention posed for placement over the valve.
Figure 3:
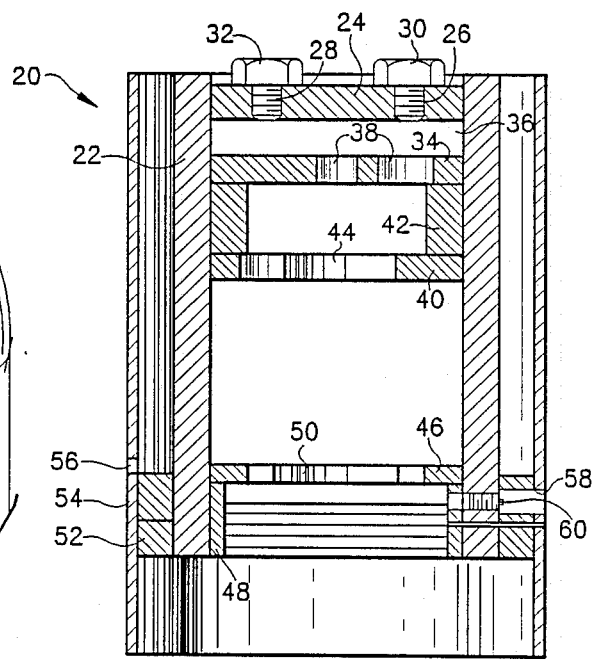
FIG. 3 is a vertical sectional view of the apparatus.
Figures 6A, 6B:
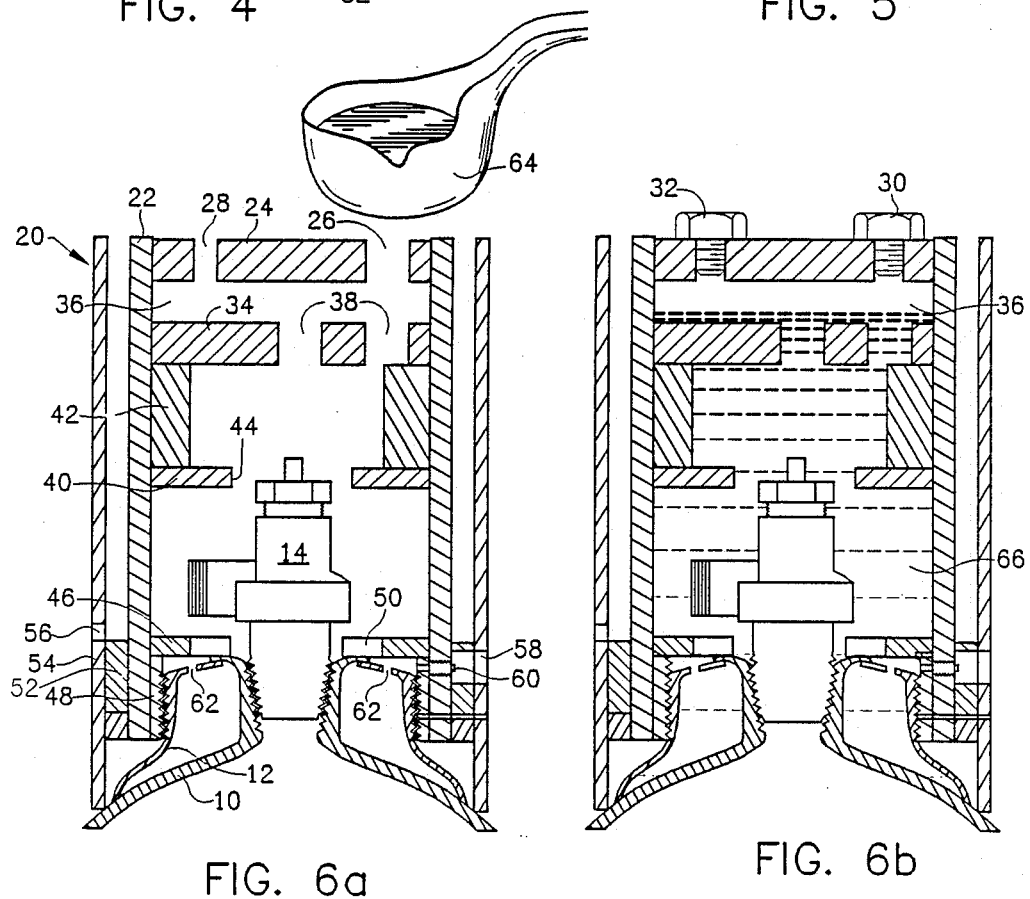
FIG. 6a is a schematic illustration, in vertical section, of the apparatus of the invention as it is about to be filled with a fusible valve encapsulating substance.
FIG. 6b is a schematic illustration similar to FIG. 6a, showing the apparatus filled with fusible substance.

The upper end portion of a compressed gas tank 10 is illustrated schematically in FIGS. 1, 6a and 6b, as comprising a conventional cylindrical tank capable of storing gases under high pressure, frequently up to several thousand pounds per square inch. At its upper end, the tank is provided with a neck having an internal screw thread, and attached to the neck is a neck ring 12 having an external screw thread. The internal thread on the tank receives a valve 14 for controlling the flow of pressurized gas from the tank. If the valve should commence leaking, a significant safety hazard is presented.

To seal off a leaking valve, the present invention provides a cap, indicated generally at 20, comprising a cylindrical vessel 22 having a closed top and an open bottom and an interior length and diameter sufficient to receive therein the entirety of the valve 14 and at least part of the externally threaded portion of the neck ring 12. At its lower end, the cylinder 22 is provided with an internal screw thread that matches and mates with the external screw thread on the neck ring so that the cap may be attached to the neck ring by rotating the cap relative to the tank.

The top of the cylinder 22 is closed by a top plate or lid 24 which is fixedly secured, as by welding, within the upper end portion of the cylinder. The lid contains a threaded fill opening 26 and a threaded vent opening 28, both of which are adapted to be sealed off by removable and replaceable threaded sealing plugs 30 and 32, respectively.

Secured within the cylinder 22 below the lid 24 is a load reducing plate 34. The plate 34 is suitably welded within the cylinder and is spaced downwardly from the lid so as to define a headspace 36 between itself and the lid. The load reducing plate has at least one and preferably two apertures 38 therethrough.

Figure 5:
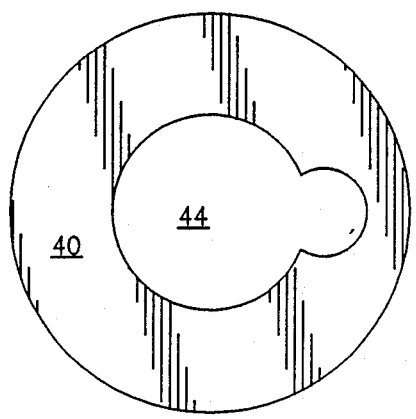
FIG. 5 is a plan view of the upper retaining ring embodied in the apparatus.

Spaced below the load reducing plate 34 within the interior of the cylinder 22 is an upper retaining ring 40. The spacing between the plate 34 and ring 40 may be determined and maintained by a cylindrical spacer bushing 42, which may if desired be welded to or formed integrally with one or the other of the plate and ring. The bushing 42 and ring 40 are securely mounted within the cylinder 22, preferably by welding. The ring 40 is provided with a key hole type of hole 44 therethrough as illustrated in FIG. 5, the hole including a circular central portion concentric with the ring and a lateral lobe.

Figure 4:
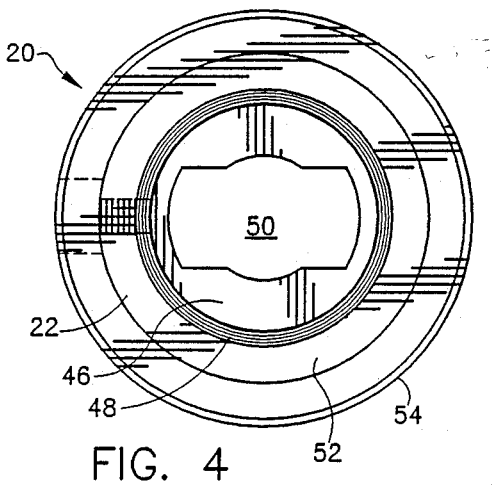
FIG. 4 is a bottom view of the apparatus illustrating the lower retaining ring therein.

Spaced below the upper retaining ring 40 within the interior of the cylinder 22 is a lower retaining ring 46, the spacing between the two rings being equal approximately to the height of the portion of the valve 14 exposed above the tank 10. The lower retaining ring 46 is also located above, preferably immediately above, the internally threaded portion at the lower end of the cylinder 22. Preferably said threaded portion is defined by an internally threaded bushing 48 secured within the lower end of the cylinder in supporting or reinforcing relationship with the lower retaining ring. As shown in FIG. 4, the lower retaining ring has a generally elliptical opening or hole 50 therethrough of a size and shape to accommodate passage of the ring over the valve 14 to enclose the valve within the cap.

As illustrated schematically in FIG. 6a, the holes 44 and 50 in the upper and lower retaining rings 40 and 46 are so shaped and so located relative to the valve 14 when the cap is lowered over the valve that the cap may be rotated relative to the valve and tank to secure the cap to the tank via the neck ring 12.

As above indicated, the lid 24, the load reducing plate 34, the two retaining rings 40 and 46, and the two bushings 42 and 48 are fixedly secured within the interior of the cylinder 22. Securement is preferably achieved by welding, and the welds are all continuous circular or circumferential welds that will ensure against any leakage between the wall of the cylinder 22 and the peripheries of the component parts mounted therein.

Secured to the exterior of the cylinder 22 at the bottom thereof, appropriately by a plurality of spot welds, is a spacer ring 52 which serves to provide a mounting for an exterior, impact absorbing, protective shell 54. The shell is spaced outwardly from the cap 20 and has a length to extend from the level of the top of the cap to a distance sufficiently below the level of the bottom of the cap as to bring the shell into contact with or close proximity to the upper surface of the tank 10 when the cap is threaded onto the tank, as is illustrated in FIGS. 6a and 6b. The shell will thus protect the cylinder 22 and an enclosed valve from damage in the event that the tank is dropped or the cap is otherwise subjected to impact forces.

One or more drain openings 56 are provided in the shell 54 immediately above the spacer ring 52 to accommodate draining of the space between the shell and the cap. A drain opening 58 is provided through the shell, the spacer ring 52, the lower end of cylinder 22 and the bushing 48 to accomodate draining of the interior of the cap. The drain opening 58 communicates with the lower end of the cylinder 22 above the neck ring 12, and is normally closed by a removable and replaceable sealing plug 60. The shell, spacer ring, cylinder and bushing 48 may also include a small diameter hole leading from the exterior of the shell to the external thread on the neck ring 12 to provide a means for checking for leaks after the valve has been encapsulated in a solid ingot of a fusible substance.

In use of the above described apparatus to seal off a leaking compressed gas tank valve, the handle or handwheel on the valve is removed and one or more holes 62 (if not already there) are drilled through the upper wall of the neck ring 12 on the tank. The cap 20 is then placed over the leaking valve 14 and the cylinder 22 is attached to the tank 10 by threadably engaging the same with the neck ring 12. The drain plug 60 is secured in place and the fill and vent opening plugs 30 and 32 are removed. A ladle 64 or like instrumentality is then used to pour a liquified fusible substance, such as a molten metal alloy having a fusion temperature in the range of about 107° F. to about 180° F., through the fill opening 26 to fill the cylinder 22 with the fusible substance up to the level of or slightly above the upper surface of the load reducing plate 34. During filling, air and gas are vented through the vent opening 28 to ensure that the cylinder 22 is completely and uniformly filled to the level of the plate 34 with a homogeneous body of the liquified fusible substance. The apertures 38 in the plate 34 and the openings 44 and 50 in the retaining rings 40 and 46 ensure passage of the substance through the plate and the rings and uniform filling of the cylinder 22 from the top of the tank to the level of the plate 34. Also, the fusible substance flows through the holes 62 in the neck ring 12 to fill the neck ring with fusible substance, thereby to seal the neck ring to the tank and the homogeneous body of fusible substance within the interior of the cylinder 22.

After filling, the fill and vent opening plugs 30 and 32 are inserted in the respective openings to sealingly close the same. The filled cap is then permitted to cool down to ambient temperature, or at least to a temperature below the fusion point of the fusible substance, thereby to cause the fusible substance to solidify around and encapsulate the leaking valve within a solid homogeneous body 66 of the fusible substance, as is illustrated in FIG. 6b.

As the fusible substance 66 solidifies about the valve 14, the substance enters into and intimately engages within the threaded connection between the valve and the tank 10, and within all cracks and crevices in the valve and about the valve stem thereby to seal off all leaks in the valve and/or its connection with the tank. After the subtance has solidified, the primary mechanical support for the cap 20 is the valve 14 and thus the tank 10, and not the cylinder neck ring 12.

Gas leaking from the valve after the fill and vent openings have been sealed and before the fusible substance becomes completely solidified will rise to the top of the cap 20 and accumulate within the headspace 36 between the lid 24 and the plate 34. A degree of pressure in the head space is desirable to maintain the fusible substance under a super-atmospheric, substance consolidating pressure as the substance cools and becomes solidified about the valve. However, the effect of the pressure should not be such as to inflict further damage to the valve 14 or to overstress the connection between the cap 20 and the neck ring 12. To ensure that the pressures transmitted to the valve and neck ring do not become excessive, the load reducing plate 34 and the retaining rings 40 and 46, due to the surface areas thereof exposed to the fusible substance taken in relation to the apertures or openings therethrough, serve to successively and progressively reduce the pressure from the headspace downwardly to the tank.

In a specific example, a gas pressure of 5,000 pounds per square inch ("psi") in the headspace 36 may be reduced to 702 psi by the load reducing plate 34, to 132 psi by the upper retaining ring 40, and to 13.5 psi by the lower retaining ring 46, thereby to reduce the total thrust force on the neck ring to only 72 pounds. In a "worst case" assumption, with all forces vertical and none lateral, the 5,000 psi headspace pressure would be successively reduced to 856 psi, 114 psi and 34 psi, thereby to reduce the total thrust force on the neck ring to just 181 pounds, which is a safe operating condition.

After the cap and fusible substance have cooled down and the fusible substance has solidified about and encapsulated the valve 14, the now unitary assembly comprised of the tank 12, the cap 20 and the encapsulated valve 14, considered as a unit, are no longer leaking and may be bodily removed from the place of use and safely transported by a conventional vehicle or truck to a repair depot without endangering personnel, pedestrians or motorists who encounter the transport vehicle.

When the transport vehicle reaches the repair depot, the tank, cap and encapsulated valve may be removed as a unit from the vehicle and processed immediately or at any convenient time inasmuch as the unit is no longer leaking. When the repair depot personnel are ready to process the unit, the unit is transferred to a processing facility where the gas can be removed safely from the tank and reclaimed or processed to a harmless condition.

Within such facility, the drain plug 60 and vent plug 32 for the cylinder 22 are removed and the cap 20 is heated to a temperature above the fusion temperature of the fusible substance 66 to convert the substance from solidified form to liquified form, whereupon the substance will drain by gravity from the cylinder via the drain opening 58. Inasmuch as the fusible substance is reusable, it is recommended that the same be recovered and reclaimed for future use.

After all or substantially all of the fusible material within the cylinder 22 has been drained from the cylinder (but not the neck ring 12 in the illustrated embodiment of the apparatus), the cap 20 may be unscrewed from the neck ring 12 and removed from the tank 10 and valve 14 to accommodate emptying of the tank and servicing of the valve, whether by repair, replacement, or more firm seating of the valve within the neck of the tank, as dictated by the nature of the leak.

In addition to serving as an impact resistant protector or shield for the apparatus, the shell 54 facilitates the heating and conversion of the fusible substance within the cylinder 22 from solid to liquid form. Specifically, as illustrated in FIG. 7, an appropriate heated liquid, suitably hot water, may be delivered by a hose 68 into and circulated through the space between the shell and the cylinder to heat the cylinder and melt the fusible substance; the water being supplied to and drained (via the drain hole or holes 56) from the space at a controlled rate to accommodate a continuous supply throughout the full height of the space of liquid at a temperature in excess of the fusion temperature, so that the fusible substance may melt and drain from the cylinder via the drain hole 58 and be recovered in an appropriate vessel or receptacle.

Figure 7:
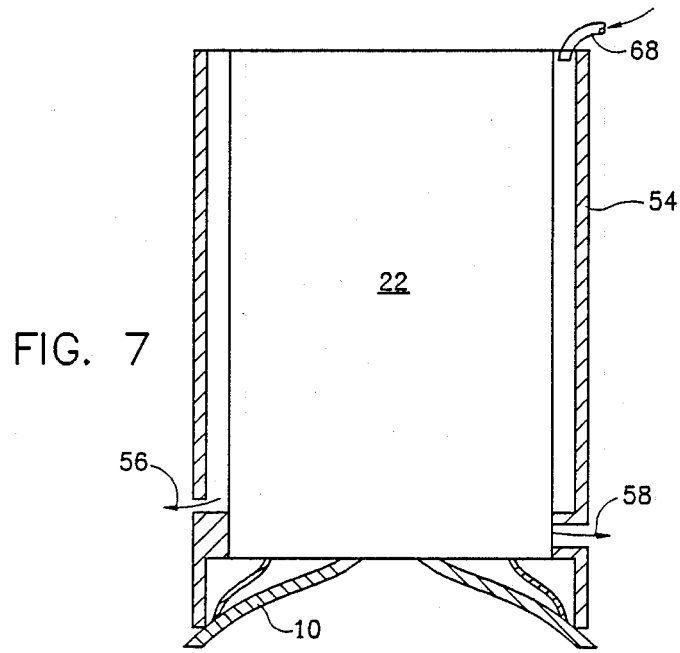
FIGS. 7 and 8 are schematic illustrations showing the manner in which the solidified fusible substance within the apparatus can be converted to liquid form and drained from the apparatus to accommodate removal of the apparatus for servicing of the valve.

To facilitate use of the apparatus and practice of the method of the invention, everything needed for practice of the method may be incorporated in a portable kit comprised of the cap 20, a supply of fusible substance adequate to fill the cylinder 22, a ladle 64 or similiar instrumentality for pouring fusible substance in liquid form into the cylinder, a heater for liquifying the fusible substance and for heating water or a like liquid thermal transfer medium, a pump and a hose for supplying the heated liquid to the cap as described in connection with FIG. 7, and a carrying case of a size to receive and carry the other components of the kit.

Figure 8:
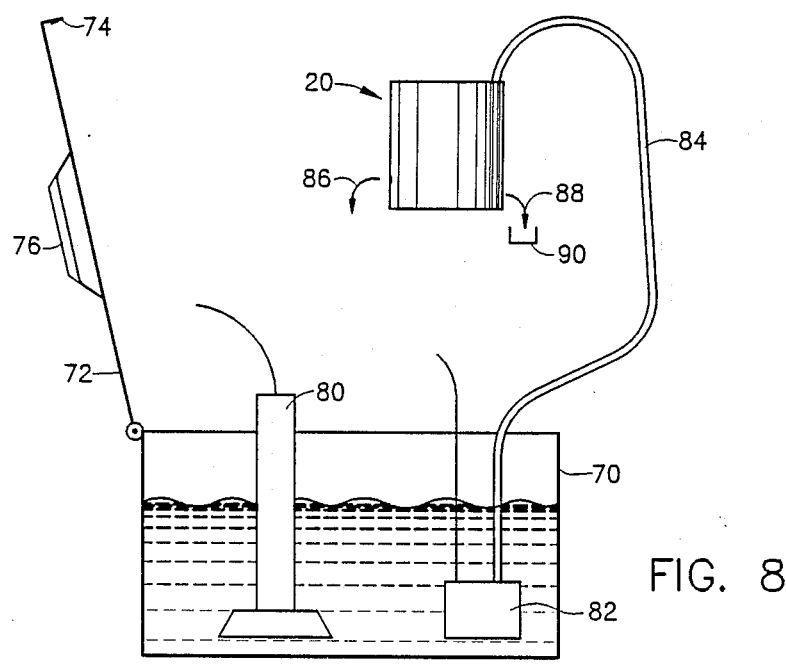

A suitable carrying case is illustrated schematically in FIG. 8 as comprising a liquid-tight container 70, a lid 72 for the container, a latch 74 for securing the lid to the container, and a handle 76 on the lid for carrying the case and the contained components of the kit.

In use, the kit is carried to the location of the tank having a leaking valve. The lid is opened and the cap 20 is removed and assembled over the leaking valve. The fusible substance and the ladle 64 are also removed from the case and the container 70 is filled with water as illustrated in FIG. 8. An electric immersion heater 80 is immersed in the water to heat the same to a temperature in excess of the fusion temperature of the fusible substance. A submersible electric pump 82 is also submersed in the water to supply hot water via a hose 84 to the cap 20 to preheat the cap and thereby prevent premature solidification of the fusible substance as it is being poured into the cylinder 22; the water being supplied to and drained from the space between the shell and the cylinder at a controlled rate to maintain the space full of hot water; the water draining from the space being returned to the container 70 for reheating and recirculation, as indicated by the arrow 86.

Alternatively, or in addition, the cap 20 may initially be preheated to an elevated temperature by immersing the same directly in the hot water in the container 70.

After the cap 20 has been preheated and assembled over the leaking valve, the ladle 64 is filled with fusible substance and the bottom of the ladle is held in the water in the container 70 until the fusible substance becomes liquid. The liquid substance is then poured from the ladle into the cylinder 22 as illustrated and described in connection with FIG. 6a. Preferably, the ladle (which is illustrated only schematically in FIG. 6a) has a capacity sufficient to fill the cylinder in one continuous pour, as described with reference to FIGS. 6a and 6b.

After the cylinder has been filled, the supply of hot water (if employed) is discontinued and the cap 20 is permitted to cool to cause the fusible substance to solidify within the cylinder. While solidification is taking place, the water may be removed from the container 70 and the heater, pump and ladle returned to the carrying case for convenient transport with the tank to the repair depot.

At the depot, the container 70 is filled with water and heated with the immersion heater 80 to a temperature above the fusion temperature of the fusible substance. The pump 82 is then set in operation to pump hot water via the hose 84 into the space between the shell 54 and the cylinder 22. As before, water draining from the space is returned to the container 70 for recirculation. With the cylinder vent and drain openings 28 and 58 open, the fusible material as it melts will drain from the cylinder, as indicated by the arrow 88, into a suitable collection vessel 90 from which the fusible material can be reclaimed. When all or substantially all of the fusible material has drained from the cylinder, circulation of the hot water is discontinued and the cap 20 is removed from the tank 10 and valve 14 to accommodate emptying of the tank and servicing the valve. The container is then emptied of the water, and the components of the kit are returned to the carrying case for convenient reuse.

Additional aides that may suitably be included in the kit to facilitate practice of the invention include a screw driver, an adjustable wrench, a spanner wrench, a thermometer, a funnel, a stirring rod, a drill bit, and a wire brush for cleaning the valve and neck ring before the process is commenced.

Thus, the invention provides a very convenient, portable kit for use in sealing leaking compressed gas tank valves in the field without need for the bulky and unwieldy coffins of the prior art.

In a preferred embodiment of the invention, the cylinder 22 is formed of 4 Sch 160 Type 304 seamless stainless steel pipe (ASTM-A312-88) having an outer diameter of 4½ inches, a wall thickness of 0.531 inches, an inner diameter of 3.438 inches and a height of 6¾ inches. The lid 24 is fabricated from Type 304 stainless steel plate (ASTM-A240-88) having a thickness of ½ inch and an outer diameter of 3.438 inches.

The load reducing plate 34, upper retaining ring 40 and lower retaining ring 46 are all preferably formed from Type 304 stainless steel bar stock having an outer diameter of 3.438 inches. The load plate 34 and the upper ring 40 have a thickness of ⅜ inch, and the lower ring 46 has a thickness of ⅜ inch. The apertures 38 in the load plate are suitably ⅝ inch and ¾ inch diameter holes. The opening 44 in the upper retaining ring 40 may be comprised of a center hole 1¼ inches in diameter and a smaller diameter lateral lobe. In a lower pressure embodiment, i.e., up to about 2,500 psi, the generally elliptical opening 50 in the lower retaining ring 46 may be about 1¼ inches wide and 2½ inches long. This size opening will restrict use of the lower pressure cap to valves and gas pressures for which it is specifically designed and will prevent use of the lower pressure embodiment with higher pressure tanks having larger valves. For caps and/or fusible substances intended for use at higher pressures, the elliptical opening 50 would be larger so as to accommodate the valves on higher pressure compressed gas tanks.

The bushings 42 and 48 are formed from chrome alloy steel bar stock, each having an outer diameter of 3.438 inches and a height of 1 inch. The bushing 42 suitably has an inner diameter of 2½ inches, and the bushing 48 has an inner diameter of 3.09 inches to provide for a screw thread that mates with the standard thread on the tank neck ring 12.

The spacer 52 is formed of mild steel having an inner diameter of 4½ inches, an outer diameter of 5½ inches and a height of 1½ inches. The shell 54 is preferably formed of AISI 1026 steel tubing having a wall thickness of 150 inch, the shell having an outer diameter of 5¾ inches, an inner diameter of 5½ inches, and an overall height of 8⅜ inches.

The headspace 36 is preferably ½ inch; the space between the plate 34 and the upper ring 40 is one inch; and the space between the two retaining rings is suitably 2⅜ inches.

The fill hole 26 is preferably a 154 inch diameter National Pipe Thread ("NPT") threaded bore, and the vent hole 28 and drain hole 58 are suitably ¼ inch NPT threaded bores.

Criteria for selection of the fusible substance are as follows:

1. The melting point should be less than 180° F. to avoid damage to the valve.
2. Tensile strength should be greater than 5,000 psi.
3. Shear strength should be greater than 3,000 psi.
4. The percent elongation in two inches should be approximately 50% as a safety factor to prevent catastrophic failure by allowing the ingot of fusible substance within the cylinder 22 to relieve excess pressure by deformation of the ingot.
5. The substance must solidify and grow to its original volume, or expand beyond its original volume, to increase interference fits within the cylinder and about the valve. There should be no ingot shrinkage with time since the system might resume leaking if the shrinkage is too great.
6. The substance should be chemically inert, contain no reactive metals, and have no or only minimal amounts of toxic materials. Also, dross should be minimal for easy cleaning.
7. The substance should be commonly available at relatively low cost.
8. The substance should have the highest possible hardness to minimize creep under slow load.
9. The substance should have the lowest possible melting point and latent heat of fusion to minimize melting time.
10. The substance should be indefinitely reusable, i.e., unaffected by repeated castings and recoveries.
11. The substance should have an indefinite shelf life and remain stable over time.

In practice of the present invention, it is preferred that the fusible substance be a metal alloy. While it is not necessary, it is also preferred that the substance be eutectic, i.e., have a sharp melting point. A number of suitable metal alloys are available from Cerro Metal Products under the trademark "CERRO". One alloy that has been successfully employed in practice of the invention is "CerroBend" C158, which is a fusible, eutectic alloy having a fusion temperature of 158° F. and a capability for use in connection with at least 39 gases and their high pressure mixtures up to 2,150 psi. If the initial volume of the C158 alloy used is 500 cubic centimeters ("cc"), the volume will upon solidification initially shrink to 491.5 cc and then grow to 503 cc, thereby to contribute to interference fits within the interior of the cylinder 22 and about the valve 14.

With the cap 20 initially preheated to a temperature of about 200° F., contraction of the cylinder upon cooling to ambient temperature, together with the growth of the C158 alloy, will result in a vertical interference fit of 0.013 inch and a horizontal interference fit of 0.009 inch. Thus, the fusible metal alloy will have a firm interference fit with the valve 14, the cylinder 22 and all of the components within the cap (other than the lid 24), and therefore will expand into and seal all of the cracks and crevices in and around the valve and its threaded mounting to the tank.

By virtue of the interference fits established upon contraction of the cap and solidification and expansion of the fusible alloy, the primary support for the cap becomes the valve which is embedded in fusible alloy having a shear strength greater than 3,000 psi. Consequently, the cap of the invention is supported mainly by the valve and the tank, and not the cylinder neck ring which normally provides all of the mechanical support for ordinary cylinder caps and attachments. Thus, the present invention provides further safety in the sealing and transport of compressed gas tanks having a leaky valve.

With the preferred embodiment of the apparatus constructed as above described, the cap will weigh about 27 pounds, the requisite amount of C158 alloy about 11 pounds, and the complete kit only 47 pounds, thereby to provide a very lightweight and portable safety kit.

In addition to use on and in connection with vertically oriented compressed gas tanks, as herein illustrated and above described, the present invention is also applicable to horizontally oriented compressed gas installations. For horizontal installations, the cylinder 22 would take the form of an elbow having a horizontal leg for association with and reception of the valve and an upwardly extending vertical leg to accommodate filling of the elbow with a fusible substance. In this case, the lid and the load reducing plate would preferably be disposed within the vertical leg, and the two retaining rings would be disposed within the horizontal leg to receive the valve.

Thus, while a preferred embodiment of the invention has been herein illustrated and described, it is to be appreciated that various changes, rearrangements and modifications may be made therein without departing from the scope of the invention, as defined by the appended claims.

What is claimed:

1. A method of sealing a leaking valve on a compressed gas tank for safe transport of the tank and valve to a repair depot, comprising the steps of:
   placing a cap over the valve and attaching the cap to the tank,
   filling the cap through a fill opening with a fusible substance in liquified form,
   venting the cap via a vent opening during filling,
   sealing off the fill and vent openings,
   causing the fusible substance to solidify within the cap and around the valve to encapsulate the valve in the solidified fusible substance,
   transporting the tank and valve with the associated cap and solidified fusible substance to a repair depot,
   at the repair depot, liquifying the fusible substance and draining it from the cap, and
   removing the cap from the tank to accommodate access to and servicing of the valve.

2. A method as set forth in claim 1, wherein the fusible substance comprises a metal alloy.

3. A method as set forth in claim 1, wherein the fusible substance has a fusion temperature within the range of from about 107° F. to about 180° F.

4. A method as set forth in claim 3, wherein the step of causing the fusible substance to solidify is accomplished by permitting the cap and the fusible substance to cool off to ambient temperature.

5. A method as set forth in claim 3, wherein the step of liquifying the fusible substance is accomplished by immersing the cap in liquid at a temperature greater than the fusion temperature of the fusible substance.

6. A method as set forth in claim 5, wherein liquid at a temperature greater than the fusion temperature of the fusible substance is circulated between the cap and an exterior shell surrounding the cap, the liquid is drained through a drain opening in a lower portion of the shell, and the fusible substance in liquified form is drained through a drain opening in a lower portion of the cap.

7. A method as set forth in claim 1, including, at the repair depot, the step of removing a drain plug from a drain opening in the lower portion of the cap and draining the fusible substance in liquified form from the cap by gravity via the drain opening.

8. Apparatus for sealing a leaking valve on a compressed gas tank to accomodate safe transport of the tank and valve to a repair depot, comprising:
   a cap of a size to fit over the valve and having a closed end and an open end for receiving the valve in the cap,
   means at the open end of said cap for attaching said cap to the tank in surrounding relation to the valve,
   a fill opening in said cap for accommodating filling of said cap with a fusible substance in liquified form,
   a vent opening in said cap for venting air and gas from the cap as the same is being filled with the fusible substance,
   means for sealing said fill and vent openings after said cap has been filled with the fusible substance,
   a drain opening in said cap for draining fusible substance in liquified form from said cap, and
   means for sealing said drain opening,
   said cap accommodating encapsulation of the leaking valve in a fusible substance which solidifies within the cap about the valve for safe transport of the tank and valve to a repair depot, and at the repair depot, reliquification and draining of the fusible substance from the cap and removal of the cap from the tank and valve to accommodate access to and servicing of the leaking valve.

9. Apparatus as set forth in claim 8, including a shell secured to and surrounding said cap in spaced relation thereto, said shell shielding said cap and a valve encapsulated therein from impact forces, said shell accomodating reception therein around said cap of a thermal medium at a temperature adequate to liquify the fusible substance in which the valve is encapsulated.

10. Apparatus as set forth in claim 8, including within said cap
   a first retaining ring spaced from the open end of said cap and having an opening therethrough to accommodate passage of the valve therethrough,
   a second retaining ring spaced from said first retaining ring and having an opening therethrough for reception of the outer end portion of the valve, and
   a load reducing plate between and spaced from said second retaining ring and the closed end of said cap, said load reducing plate having at least one aperture therethrough and defining a headspace between itself and the closed end of said cap,
   said aperture in said plate and said openings in said rings accommodating filling of said cap with fusible substance up to said load reducing plate to completely encapsulate the valve in the fusible substance,
   said headspace, when said fill and vent openings are sealed, accommodating accumulation therein of a head of pressurized gas for maintaining a superatmospheric pressure on the fusible substance and the valve encapsulated therein,
   said load reducing plate and said retaining rings progressively reducing the pressure in said cap from said headspace to the tank to mitigate overstressing of the encapsulated valve and said means attaching said cap to the tank.

11. A portable kit for sealing a leaking valve on a compressed gas tank to accomodate safe transport of the tank and valve to a repair depot, comprising:
   (a) a valve sealing apparatus as set forth in claim 8,
   (b) a supply of a fusible substance in solidified form adequate to fill the cap of said apparatus with the fusible substance,
   (c) a ladle,
   (d) a heater,
   (e) a pump, and
   (f) a water-tight container of a size to receive and carry the above recited kit components (a) through (e), said container having a lid and a carrying handle,
   said container being portable to transport said kit components (a) through (e) to the locale of the compressed tank having a leaking valve,
   said container upon removal therefrom of said components (a) through (e) consituting a reservoir for reception of a heatable liquid,
   said heater having a heating capacity sufficient to heat the liquid in said container to a temperature above the fusion temperature of the fusible substance,
   said ladle receiving the fusible substance therein and being immersable in the heated liquid for converting the fusible substance from solidified form to liquified form and for pouring the fusible substance in liquified form into the cap of said apparatus through the fill opening therein,
   the fusible substance thereafter solidifying within the cap of said apparatus to accomodate transport of the tank and valve to the repair depot,
   said pump being operable to circulate heated liquid around the cap of said apparatus to convert the fusible substance from solidified form to liquified form to accomodate draining of the fusible substance from the cap and removal of the cap for servicing of the valve.

12. A kit as set forth in claim 11, wherein said apparatus includes a shell secured to and surrounding the cap in spaced relation to the cap, said pump being operable to pump heated liquid into the space between the cap and the shell to circulate heated liquid within said space to heat said cap.

13. A kit as set forth in claim 11, wherein said fusable substance comprises a metal alloy having a fusion temperature in the order of from about 107° F. up to about 180° F.

14. A kit as set forth in claim 11, wherein said heater is an immersion heater.

15. A kit as set forth in claim 11, wherein said pump is a submersable pump.

* * * * *